Figure 1:
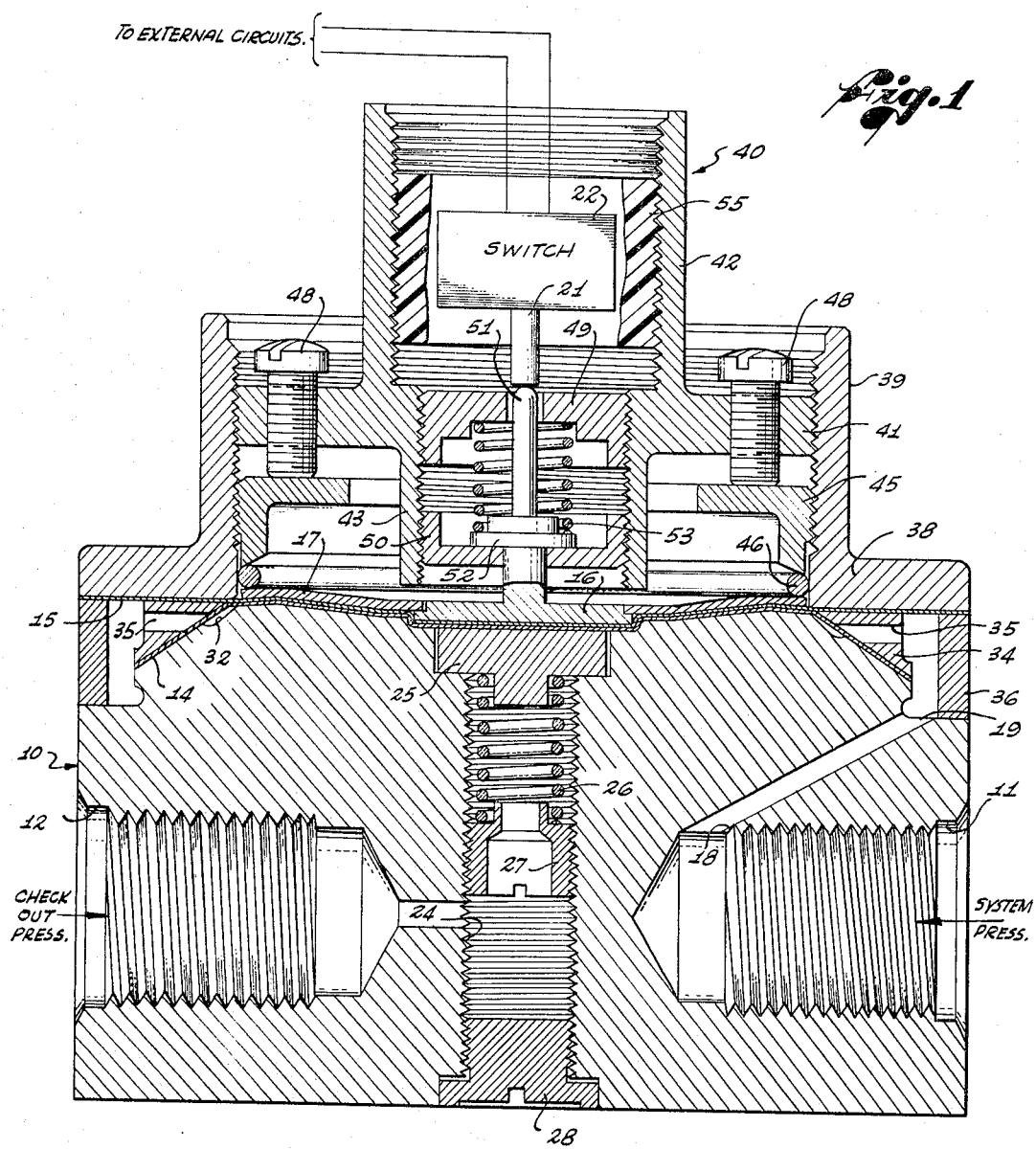

April 9, 1968 D. L. GRIFFITH ET AL 3,376,794
FLUID PRESSURE DEVICE
Filed May 17, 1965 2 Sheets-Sheet 2

INVENTORS
DONALD L. GRIFFITH
STARR K. WILLIAMS
Fulwider, Patton, Rieber,
Lee and Utecht
ATTORNEYS

United States Patent Office 3,376,794
Patented Apr. 9, 1968

3,376,794
FLUID PRESSURE DEVICE
Donald Lee Griffith, Northridge, and Starr King Williams, Reseda, Calif., assignors to Custom Component Switches, Inc., Chatsworth, Calif., a corporation of California
Filed May 17, 1965, Ser. No. 456,139
8 Claims. (Cl. 92—63)

This invention relates to mechanisms to be actuated by fluid under pressure, and more particularly to an improved device having pressure-sensitive diaphragms for developing mechanical or electromechanical operations in response to pressure applied thereto, and which is suitable for pressure transducers, switches, meters and the like.

More specifically, this invention relates to the type of pressure-responsive device employing a pair of flexible diaphragms located between a mechanically movable element and a fluid inlet port, and wherein another fluid inlet port is provided for passing fluid into the space between the diaphragms. Typically, such devices are connected so that the inlet port to the space between the diaphragms is connected to a so-called "system" pressure line, and the other inlet port is connected to a standard or "check-out" pressure line.

Such devices are designed to operate so that when system line pressure between the diaphragms reaches a predetermined level, the diaphragm nearest the movable element is forced outwardly to impart movement to that element, and thereby operate a suitable mechanism, such as a pressure switch. Also, for checking or test purposes when desired, pressure at a known level is applied through the standard pressure port to actuate both diaphragms, as through a rod connected between them, to operate the pressure switch.

Desirably, the level of the check-out pressure needed to actuate the transducer should be the same as the system pressure which performs the same operation. However, it has been found that the check-out pressure almost invariably is higher than the system pressure in this regard. A primary reason for this failure of the check-out pressure to match the operating system pressure lies in the fact that the diaphragm adjacent the check-out port has a different effective area and/or configuration than the other diaphragm—they cannot be made identical by known manufacturing techniques. Furthermore, the diaphragm adjacent the check-out port is characterized in that it has an inherent spring rate, and this spring rate differs from the spring rate of the other diaphragm. Accordingly, a check-out pressure needed to actuate the transducer must exceed the level of the operating system pressure by an amount necessary to overcome the effects of the diaphragm adjacent the check-out port.

However, the difference between system and check-out pressures is not a constant, so that the system pressure for operating the switch cannot be computed by simply subtracting a given incremental pressure from a reading of the check-out pressure. The same factors which necessitate the use of a higher check-out pressure make it necessary to use different check-out pressures at widely different pressure levels and temperatures.

Thus, checking and testing procedures for pressure-responsive devices of this type heretofore known are inherently unreliable.

It is an object of this invention to provide an improved pressure-responsive device which overcomes the above and other disadvantages of the prior art.

It is another object of this invention to provide a pressure-responsive device employing two diaphragms in which a check-out pressure needed to make it operate can be relied upon as being the same as the system pressure needed for its operation.

A further object of this invention is to provide an improved pressure-responsive device having dual diaphragms in which, despite differences in effective areas, configurations or spring rates, the check-out pressures at markedly different temperatures and pressure levels do not differ from the system pressure required to make the device operate.

Yet another object of this invention is to provide an improved pressure-responsive device having a minimum number of component parts of simple design capable of reliable operation over a long operating life.

Figure 2:
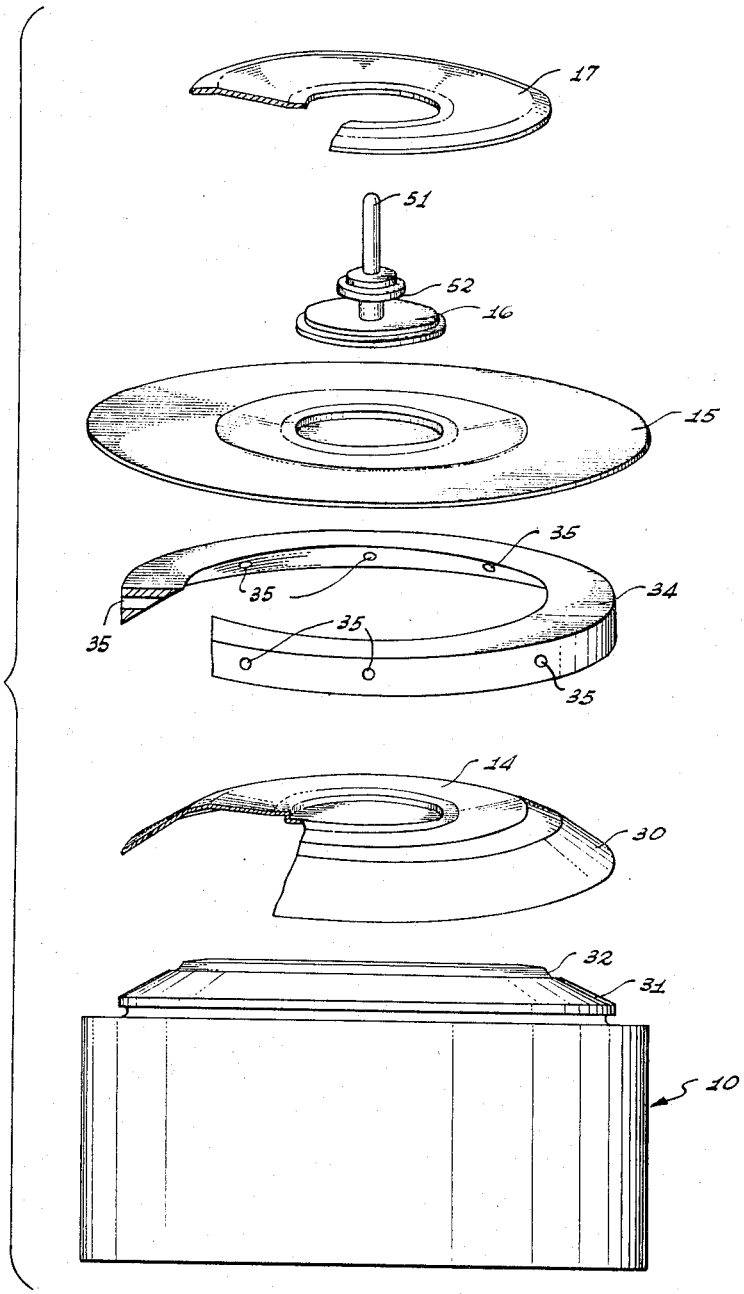

The above and other objects and advantages of this invention will become apparent from the following description taken in conjunction with the accompanying drawings of an illustrative embodiment thereof, in which:

FIGURE 1 is a sectional view of the pressure-responsive device of this invention; and FIGURE 2 is an exploded view of a number of parts of the device of FIGURE 1, with the main body shown in elevation and the remaining parts shown in perspective.

Referring to the drawings, there is shown a main body 10 which has an inlet port 11 for connection to a system pressure line, and an inlet port 12 through which to apply a check-out pressure. Placed against one face of the body 10 (the upper face as seen in FIGURE 1), are two diaphragms 14, 15, which preferably have spring rates and effective areas as nearly identical as possible, and which are in surface-to-surface contact over most of their surface areas. Overlaying the upper diaphragm is a spring system which includes a biased pressure plate 16 engaging the center portion thereof, and a disk spring 17, shown as a Belleville spring, surrounding the pressure plate 16.

The diaphragms 14, 15 have peripheral surface portions beyond the periphery of the spring 17 which are not in contact, and system pressure applied through the inlet port is directed through the body, as through a conduit 18, into an annular space 19 to be introduced between the edge portions of the diaphragms. The contacting surface portions of the diaphragms are moved apart by the system fluid, and when such fluid pressure is sufficient to overcome the spring system, it effects an upward movement of the pressure plate.

The upper end of the pressure plate 16 is adapted, upon such movement, to operate a suitable mechanism, such as actuating the plunger 21 of a snap switch 22 located in a network of external circuits. Upon the system pressure dropping below that required to effect the switch-actuating operation of the pressure plate 16, the diaphragms return to face-to-face contact. In this latter connection, in using a disk spring it is preferable to use one which can only return, i.e., which is a snap-back type and not a sanp-over type, but which will not release the plunger 21 until the applied pressure reaches a predetermined pressure that is lower than that which forced the spring upwardly to depress the plunger. In this manner, a measure of stability is achieved to prevent inadvertent on-off operations of the switch 22 when there is a negligible decrease from the pressure which resulted in closure of the switch.

To check the operation of the device, check-out pressure is applied through the port 12 to a center opening 24 in the body 10 to act against the center portions of the diaphragms and pressure plate 16 to overcome the bias of the pressure plate and the spring 17 to effect operation of the switch 22. This operation is accomplished with a check-out pressure which is exactly the same as that of the system pressure required to actuate the pressure plate 16 as above described. In this connection there is provided a back-up plate or shoe 25 in the enlarged upper end of the opening 24, and the shoe 25 is biased toward the pressure plate 16, as through a compression spring 26 which extends between the shoe 25 and an adjustment screw 27 that is threaded in the opening 24. The screw 27 is adjusted so that the spring pressure on the shoe 25 is sufficient to remove or nullify the effects of the spring rate and the rate of change of the effective area of the diaphragm 14.

In this latter connection, it should be pointed out that as the diaphragm 14 moves, there is a change in both its spring rate and effective area. In the absence of spring 26, if the diaphragm 14 is moved with the other diaphragm 15 to a position to operate the switch 22, the check-out pressure for actuating the switch exceeds that of the system pressure by an amount required to overcome the effects of the spring rate and effective area of the diaphragm 14.

The spring 26 is chosen so that its spring rate approximates that of the net effective spring rate of the lower diaphragm 14. Initially after assembly, with check-out pressure of the desired level applied, the spring 26 is adjusted until it exerts a force on the shoe 25 such that operation of the switch 22 occurs at that check-out pressure—which is precisely the same as the system pressure needed to actuate the switch. Thereafter, and throughout the desired pressure and temperature range of operation of the system, the check-out pressure is assured of being the same as the system pressure which operates the switch.

As shown in FIGURE 1, the threaded opening 24 extends along the axis of the body 10 and at right angles to the check-out port 12, and the opening 24 is closed at its lower end by a plug 28, which preferably is welded in place after the adjustment screw 27 is located in the desired position. It will be apparent, however, that this arrangement can readily be modified, as by eliminating the plug 28 and having the check-out port located on the axis of the opening 24 at the lower surafec of the body 10.

In this particular embodiment of our invention, the upper face of the body 10 is formed with a central recess to receive the lower end of the pressure plate 16, and with the surface area surronunding the recess being contoured to conform to the configuration of the surface contour of the disk spring 17. The diaphragms 14, 15 are formed with central depressions so as to matingly fit over the lower surface of the pressure plate 16, and with their surrounding surface portions shaped to the contours of the upper face of the body and the spring 17. Although the diaphragms may be made of any desired material, preferably they are formed of weldable metal, e.g., stainless steel, that is sufficiently thin as to characterize them as diaphragms having substantially smaller spring rates than the spring rate of the spring 17, and preferably so thin as to be characterized as limp diaphragms having negligible spring rates.

Outwardly of the above-described contoured surface thereof, the lower diaphragm 14 is formed with a frusto-conical section 30 (see FIGURE 2). Similarly, the body 10 is formed with a matching frusto-conical section 31. The body section 31 adjacent its upper portion is formed with an annular relief, indicated at 32, so that when no system pressure is applied to the device, the portion of the diaphragm 14 adjacent the relief 32 is not in touching engagement with that portion of the body. The diaphragm 14 at its lower edge is secured to the body 10, preferably by welding. In this connection, any suitable welding technique may be employed, including heliarc welding in which no flux or additives is employed, i.e., the weld is formed of parent metal.

Surrounding the conical section 30 of the diaphragm 14 is a ring 34 which in cross-section is in the shape of a right triangle having the hypotenuse directed inwardly, i.e., the ring 34 has an inner surface configuration in the form of an inverted cone. This conical surface of the ring abuts the frusto-conical section 30 of the diaphragm 14 and is welded to the body therewith. The ring 34 has a plurality of horizontal openings 35 extending through the body thereof. As shown, the outer diameter of the ring 34 is less than that of the body 10 so that system fluid entering the conduit 18 and the annular space 19 can pass through the openings 35 in the ring 34 to impinge upon the outer surface of the conical section 30 of the lower diaphragm 14. The side walls of the annular opening 19 are formed by the outer surface of the ring 34 and the inner wall of an encircling ring 36 that is secured at its lower edge to the body 10.

The portion of the upper diaphragm 15 outwardly of the periphery of the disk spring 17 is horizontally disposed, and as shown extends along the upper surface of the ring 34 and the upper edge of the encircling ring 36. Abutting the horizontal porton of the upper diaphragm 15 is the radial face of the flange 38 of a tapped tubular element 39. Thus, the peripheral edge portion of the upper diaphragm 15 is sandwiched between confronting surface portions of the flange 38 and the ported ring 34 and encircling ring 36. These three elements are secured together, again preferably by a suitable welding technique. Also, the lower edge of the ring 36 is welded to the body. Thus, the upper and lower walls of the annular chamber 19 are formed by the body 10 and the lower surface of the upper diaphragm 15.

The tubular element 39 forms a support member for the aforementioned spring system in which the pressure plate 16 and disk spring 17 are located, and it also supports the housing for the switch 22. In this connection, there is shown a tubular element 40 which has an externally threaded flange portion 41 threaded into the member 39, and having tapped end portions 42, 43 of different diameters. Surrounding the lower end portion 43 below the flange 41 is an apertured cup 45 having its skirt externally threaded. The cup 45 is threaded into the tubular element 39 until its lower end engages a ing 46 which registers against the outer or anchoring edge portion of the spring 17. The cup 45 is threaded downwardly until the ring 46 is pressed firmly against the spring 17. To aid in holding the cup 45 (and hence the ring 46) in place, and to prevent rotation thereof, spaced back-up bolts 48 are threaded through the flange 41 to engage the upper surface of the cup 45.

Threaded into the lower portion 43 of the tubular element 40, are adjustment screws 49, 50. The stem 51 of the pressure plate 16 is provided with an flanged portion, indicated at 52, which rests on the upper surface of the adjustment screw 50. A compression spring 53 extends between the flange 52 and the lower surface of the adjustment screw 49. The spring 53 and disk spring 17 cooperatively determine the force required to move the pressure plate and actuate the switch 22. An arrangement similar to that of springs 17 and 53 is disclosed in U.S. Patent No. 3,133,171, entitled "Pressure Switch," of Donald L. Griffith, issued May 12, 1964. In this connection, the disk spring 17 need not contact the upper diaphragm, but, as in said patent, the pressure plate 16 may be enlarged to overlay the diaphragm 15, and the disk spring 17 may be spaced from the diaphragm as in said patent.

As previously mentioned, the device is adapted to support the housing for the switch 22. To this end, the housing for the switch is embedded in a plastic body 55 which is threaded into the upper portion 42 of the tubular element 40.

One form of pressure-responsive device made as illustrated and described herein is a pressure switch in which the various parts are formed of stainless steel. With the diaphragms sandwiched between solid elements (pressure plate 16 and shoe 25), extremely thin diaphragms can be used in the pressure of fluid pressures which would either rupture them or deform them so as to change their spring rates. Such a pressure switch, using diaphragms 14, 15 of less than .001-inch thickness, a Belleville spring of .016-inch thickness and 1.312-inch outer diameter, and a pressure plate of 0.570-inch diameter, is able to handle pressures up to 400 pounds per square inch, over a temperature range of ±400° F., and to reliably operate the pressure switch at the same pressures (25 pounds per square inch) for the system fluid and check-out fluid throughout such temperature range.

From the foregoing, it will be apparent that various modifications can be made in our invention without departing from the spirit and scope thereof. Accordingly, we do intend that the invention be limited, except as by the appended claims.

We claim:
1. In combination:
a pair of disk-like diaphragms in intimate face-to-face contact, each having a respective spring rate and effective area;
means supporting said diaphragms for limited axial movement in one direction only, the spring rates and effective areas of said diaphragms causing them to oppose such movement, said means including a body having a support surface, one of said diaphragms being in intimate face-to-face contact with said surface, said body having a threaded opening extending to the axis of said one diaphragm through which to direct fluid against it, said opening being enlarged adjacent said one diaphragm;
means applying a force to one diaphragm that is equal and opposite to the force of its net effective spring rate which opposes movement in said one direction, whereby said one diaphragm is effectively made to act as a limp diaphragm, whereby movement of both diaphragms in said one direction is effected by the force needed to overcome the effects of the spring rate and effective area of the other diaphragm alone, said force applying means including;
a back-up plate filling the enlarged portion of said opening and being in face-to-face contact with said one diaphragm;
an adjustment screw threaded in said opening;
a compression spring extending between said screw and said back-up plate;
a Belleville spring overlaying the other diaphragm and having a characteristic surface contour, said Belleville spring having a central opening;
a pressure plate located in said central opening and abutting said other diaphragm, said pressure plate having a stem extending through the central opening of said spring;
said suport surface of said body having a contour conforming to those of the confronting surface portions of the pressure plate and Belleville spring;
said diaphragms being contoured to match the contour of said support surface;
a ring registering against the outer peripheral edge portion of said Belleville spring, said ring being axially adjustable;
spring means against which said pressure plate is adapted to be moved by the diaphragm;
and said body having a conduit through which to direct fluid between said diaphragms.

2. The combination defined in claim 1, wherein
said diaphragms have edge portions extending beyond the periphery of said Belleville spring, the edge portions of said diaphragms diverging from each other;
a ring fitted between the diverging edge portions of the diaphragms, said ring having spaced transverse openings therethrough, said one diaphragm having its peripheral edge portion sealingly secured to said body;
a solid ring having an inner diameter greater than the outer diameter of said first-mentioned ring, said ring at one end being sealingly secured to said body;
a tubular member having a flange, the peripheral edge portion of the other diaphragm being located between and sealingly secured to said flange and the other edge of said solid ring; and
a conduit in said body in fluid communication with the annular space between said rings, whereby fluid entering said conduit can pass through said transverse openings and be forced between the diaphragms.

3. The combination defined in claim 2, wherein the stem of said pressure plate extends into said tubular member;
and an external mechanism to be actuated by said stem, said mechanism having an element to be moved by said stem upon movement of said pressure plate in response to fluid applied through either the opening or the conduit in said body which is sufficient to effect movement of the diaphragm engaged by the pressure plate.

4. A fluid pressure device comprising:
a disc spring having a characteristic surface contour and spring rate, said disc spring having a central opening;
a pressure plate located in and engaging the edge of said central opening, said disc spring and engaged pressure plate defining an effective area;
a first diaphragm means in intimate contact with said disc spring and pressure plate, said first diaphragm means having an effective area substantially equal to that of said disc spring and engaged pressure plate, said first diaphragm means further having a spring rate substantially less than that of said disc spring;
a second diaphragm means in intimate contact with said first diaphragm means with a substantially equal effective area, said second diaphragm means having the characteristics of a limp diaphragm;
a solid body having a support surface in intimate contact with a major portion of said second diaphragm means;
first fluid introduction means for introducing fluid between said first and second diaphragm means to effect movement of said first diaphragm means and said disc spring and pressure plate; and
second fluid introduction means for introducing fluid between said second diaphragm means and said support surface to effect movement of said first and second diaphragm means and said disc spring and pressure plate, the movement of said first diaphragm means and said disc spring and pressure plate being substantially equal to that caused by the introduction of fluid at an equal pressure into said first fluid introduction means.

5. The fluid pressure device of claim 4 wherein said second diaphragm means having the characteristics of a limp diaphragm comprises:
a non-limp diaphragm having a spring rate substantially less than that of said disc spring; and
biasing means to substantially nullify the effects of the spring rate of said non-limp diaphragm.

6. The fluid pressure device of claim 5 wherein said biasing means comprises:
a portion of said solid body defining a threaded opening coaxial with the axis of said non-limp diaphragm, said opening being enlarged adjacent said non-limp diaphragm;
a back-up plate within the enlarged portion of said opening, said back-up plate being in intimate contact with the adjacent non-limp diaphragm;
an adjustment screw threaded in said opening in said body; and
a compression spring extending between said screw and said back-up plate for cooperating with said screw to provide a force against said non-limp diaphragm to nullify the effects of the spring rate of said non-limp diaphragm.

7. A fluid pressure device comprising:
disc spring means having a characteristic surface contour and spring rate;
pressure plate means cooperatively associated with the central portion of said spring means;
a first diaphragm means in intimate contact with said disc spring means and pressure plate means, said first diaphragm means having an effective area substantially equal to that of said disc spring means and said pressure plate means, said first diaphragm means further having a spring rate substantially less than that of said disc spring means;

a second diaphragm means in intimate contact with said first diaphragm means and having a substantially equal effective area, said second diaphragm means further having the characteristics of a limp diaphragm;

a solid body having a support surface in intimate contact with a major portion of said second diaphragm means;

first fluid introduction means for introducing fluid between said first and second diaphragm means to effect movement of said first diaphragm means and said disc spring means and pressure plate means; and second fluid introduction means for introducing fluid between said second diaphragm means and said support surface to effect movement of said first and second diaphragm means and said disc spring means and pressure plate means, the movement of said first diaphragm means and said disc spring means and pressure plate means being substantially equal to that caused by introduction of fluid at an equal pressure into said first fluid introduction means.

8. A fluid pressure device comprising:

disc spring means having a characteristic surface contour and spring rate, said disc spring means further having a central pressure plate means;

a first diaphragm means in intimate contact with said disc spring means, sad first diaphragm means having an effective area substantially equal to that of said disc spring means, said first diaphragm means further having a spring rate substantially less than that of said disc spring means;

a second diaphragm means in intimate contact with said first diaphrgam means and having a substantially equal effective area, said second diaphragm means further having the characteristics of a limp diaphragm;

a solid body having a support surface in intimate contact with said second diaphragm means over a portion thereof;

first fluid introduction means for introducing fluid between said first and second diaphragm means to effect movement of said first diaphragm means and said disc spring means; and second fluid introduction means for introducing fluid between said second diaphragm means and said support surface to effect movement of said first and second diaphragm means and said disc spring means, the movement of said first diaphragm means and said disc spring means being substantially equal to that caused by the introduction of fluid at an equal pressure into said first fluid introduction means.

References Cited

UNITED STATES PATENTS

| | | | |
|---|---|---|---|
| 1,703,531 | 2/1929 | Hyde | 92—98 X |
| 1,910,322 | 5/1933 | Coffin et al. | 92—101 X |
| 2,704,551 | 3/1955 | Ralston. | |
| 2,936,785 | 5/1960 | Hastings | 92—50 X |
| 3,208,264 | 9/1965 | Melton | 73—4 |
| 3,267,819 | 8/1966 | Valentine | 92—49 X |

MARTIN P. SCHWADRON, *Primary Examiner.*